United States Patent
Britten et al.

(10) Patent No.: US 8,443,952 B2
(45) Date of Patent: May 21, 2013

(54) TRANSMISSION

(75) Inventors: Alfons Britten, Friedrichshafen (DE); Jan-Peter König, Groβ Kreutz (DE)

(73) Assignees: Dr. Ing. h.c. F. Porsche Aktiengesellschaft, Stuttgart (DE); ZF Friedrichshafen AG, Friedrichshafen (DE)

( * ) Notice: Subject to any disclaimer, the term of this patent is extended or adjusted under 35 U.S.C. 154(b) by 139 days.

(21) Appl. No.: 13/090,524

(22) Filed: Apr. 20, 2011

(65) Prior Publication Data

US 2011/0259135 A1  Oct. 27, 2011

(30) Foreign Application Priority Data

Apr. 22, 2010 (DE) .......................... 10 2010 017 922

(51) Int. Cl.
*F16D 23/06* (2006.01)
*F16D 11/14* (2006.01)

(52) U.S. Cl.
USPC .................. 192/69.9; 192/53.34; 192/114 T

(58) Field of Classification Search
USPC ............................ 192/53.34, 69.9, 108, 114 T
See application file for complete search history.

(56) References Cited

U.S. PATENT DOCUMENTS

| | | | |
|---|---|---|---|
| 2,070,140 A | | 2/1937 | Peterson |
| 2,535,388 A | * | 12/1950 | Burks et al. ................ 192/48.91 |
| 3,137,376 A | * | 6/1964 | Schick ........................ 192/48.91 |
| 3,334,715 A | | 8/1967 | Bibbens |
| 3,537,558 A | * | 11/1970 | Bibbens ..................... 192/114 T |
| 4,189,041 A | * | 2/1980 | Muller ........................ 192/53.34 |
| 6,755,090 B2 | * | 6/2004 | Ima ................................ 74/330 |

FOREIGN PATENT DOCUMENTS

| | | |
|---|---|---|
| DE | 744949 | 1/1944 |
| DE | 1500326 | 3/1973 |
| DE | 19541843 | 5/1997 |
| DE | 102004051421 | 4/2006 |
| DE | 102005059733 | 6/2007 |

* cited by examiner

*Primary Examiner* — Richard M. Lorence
(74) *Attorney, Agent, or Firm* — RatnerPrestia

(57) ABSTRACT

A transmission having at least one shaft, on which a guide sleeve which has a first external toothing system is arranged fixedly so as to rotate with it and at least one slider sleeve which has an internal toothing system is arranged, it being possible to adjust the slider sleeve between a disengaged position, in which the internal toothing system and a second external toothing system on a clutch element are not operatively connected, and an engaged position, in which the internal toothing system meshes with the second external toothing system. The internal toothing system and/or the first external toothing system are/is configured in such a way that there is merely punctiform contact between them in the engaged position. As a result, in particular, an undesired gear disengagement can be suppressed.

7 Claims, 2 Drawing Sheets

TRANSMISSION

CROSS-REFERENCE TO RELATED APPLICATIONS

This application claims priority to German Patent Application No. DE 10 2010 017 922.1, filed Apr. 22, 2010, the contents of which are incorporated by reference herein.

FIELD OF THE INVENTION

The present invention relates to a transmission having at least one shaft.

BACKGROUND OF THE INVENTION

DE 744 949, which is incorporated by reference, has disclosed a transmission of the generic type having at least one shaft, on which a guide sleeve which has a first external toothing system is arranged fixedly so as to rotate with it and at least one movable wheel which has a second external toothing system is arranged rotatably. Moreover, at least one slider sleeve is provided which can be displaced in the axial direction of the shaft and has an internal toothing system, the slider sleeve and the guide sleeve being configured in the manner of a claw clutch.

DE 1 500 326, which is incorporated by reference, has likewise disclosed a claw clutch for a transmission of the generic type. In order for it to be possible here to ensure improved securing against an undesired disengagement of the coupled clutch parts, only the tooth flank edges of the teeth of the slider sleeve interact in a torque transmitting engagement position with in each case those sections of the recess in a flank of an external toothing system of a movable wheel which are chamfered in the manner of a ramp. Here, the force which counteracts a relative disengagement movement of the coupled toothing systems is therefore always necessarily active, as long as undesired external forces occur during the torque transmitting contact of the components which are engaged with one another.

Finally, U.S. Pat. No. 2,070,140, which is incorporated by reference, has disclosed a further transmission and a further clutch arrangement for a vehicle transmission, in which a positively locking connection is achieved between the slider sleeve and the guide sleeve as a result of a defined shape of a tooth flank region of a slider sleeve and of an associated guide sleeve. Here, the guide sleeve is shaped correspondingly in an overlap region with the slider sleeve.

Depending on the construction, a frictional force can occur at a given torque in conventional transmissions, which frictional force pulls the slider sleeve to the movable wheel or else pushes it away from the movable wheel. If, for example, the slider sleeve is pushed away to a pronounced extent from the movable wheel, what is known as a "gear jump" can occur, that is to say an undesired gear disengagement. Routine countermeasures against this are, for example, undercuts or the increase of latching retaining forces, it being possible for said countermeasures to have negative effects in some circumstances on the shift quality.

SUMMARY OF THE INVENTION

The present invention deals with the problem of specifying an improved or at least an alternative embodiment for a transmission of the generic type, which embodiment is distinguished, in particular, by a reduction in engagement disruptions between a guide sleeve and a slider sleeve.

According to aspects of the invention, this problem is solved by the subjects of the independent claims. Advantageous embodiments are the subject matter of the dependent claims.

The present invention is based on the general concept of developing a torque transmitting toothing system between a guide sleeve and an associated slider sleeve in a transmission, preferably in a motor vehicle, in such a way that there is merely punctiform contact between the respective toothing systems of the guide sleeve and the slider sleeve in the coupled position. This is achieved, for example, by a double width camber of the individual flanks of the teeth of a first external toothing system of the guide sleeve. Here, the punctiform contact increases a degree of tilting freedom between the guide sleeve and the associated slider sleeve considerably, as a result of which a resulting axial frictional force which could lead to what is known as a "gear jump" in the most unfavorable case can have its magnitude reduced to a pronounced extent. At the same time, undercuts can be kept small as standard as a result of the punctiform contact according to aspects of the invention between the guide sleeve and the slider sleeve. The punctiform contact between the first external toothing system of the guide sleeve and the corresponding internal toothing system of the slider sleeve, which punctiform contact is achieved, for example, by the double width camber, can be produced inexpensively here, for example by a corresponding variation in a radial feed (profile displacement) of a grinding or milling tool along an axial path over the width of the guide sleeve. Here, in general, the guide sleeve and the slider sleeve are a constituent part of a transmission which additionally has at least one shaft, on which the guide sleeve which has the first external toothing system is arranged fixedly so as to rotate with it and at least one clutch element which has a second external toothing system and can be connected fixedly to a movable wheel so as to rotate with it is arranged. The slider sleeve which can be displaced in the axial direction of the shaft and has the corresponding internal toothing system is additionally arranged on said shaft, it being possible to adjust said slider sleeve between a disengaged position, in which the internal toothing system and the second external toothing system are not operatively connected, and an engaged position, in which the internal toothing system meshes with the second external toothing system. In order to realize the punctiform contact according to aspects of the invention between the internal toothing system of the slider sleeve and the first external toothing system of the guide sleeve, the first external toothing system is preferably configured in this way, for example is provided by means of a double width camber, since the merely punctiform contact according to aspects of the invention is formed between these two said toothing systems in the engaged position. It goes without saying here that a corresponding formation can also be provided merely on the internal toothing system of the slider sleeve or on both toothing systems. Here, in general, the double width camber brings about a situation where a tooth flank region of the guide sleeve is of convex configuration in the overlap region between the slider sleeve and the guide sleeve, as a result of which the contact zone between the slider sleeve and the guide sleeve lies in the center of the overlap region if a gear is engaged. Here, the internal toothing system of the slider sleeve can remain unchanged in the overlap region with the guide sleeve, that is to say, for example, the flanks of the teeth of the internal toothing system of the slider sleeve can be of straight or perpendicular configuration within the contact zone, that is to say within the overlap region with the guide sleeve. The toothing system which is configured according to aspects of the invention can prevent, in particular, axial migration of the slider sleeve and, associated with this, what is known as a "gear jump", in which the connection between the movable wheel and the shaft would no longer exist and, as a result, a torque transmission from the shaft to the movable wheel ceases. Here, the change of the toothing system toward the merely punctiform contact can be achieved simply in terms of manufacturing technology and inexpensively at the same time.

In one advantageous development of the solution according to aspects of the invention, the first external toothing system of the guide sleeve has a plurality of teeth with in each case one thrust flank and one traction flank, at least the thrust flanks having two convex bulges. In the present document, said two convex bulges are also called double camber or double width camber, it being possible for the two convex bulges to have, for example, the shape of a sine wave in plan view. Here, the flanks are of reduced configuration in each case axially on the end side, as a result of which a movement space for the slider sleeve which tumbles in some circumstances can be produced in the regions which become free as a result. Squeezing between the slider sleeve and the guide sleeve can be reduced as a result. It goes without saying that it is conceivable here that the arched geometry according to aspects of the invention is applied separately either only on the traction flank or on the thrust flank, it also being conceivable that bulges which bring about punctiform contact with the internal toothing system of the slider sleeve are provided on the traction flank and on the thrust flank of the first external toothing system of the guide sleeve. Here, the bulges on the traction flank and on the thrust flank of each tooth of the first external toothing system of the guide sleeve can be of identical or else different configuration. In addition, a considerable reduction in acoustic peculiarities, in particular in the low load and low speed ranges, can be achieved by way of the flanks configured according to aspects of the invention of the first external toothing system of the guide sleeve and the merely punctiform contact with the slider sleeve which can be achieved as a result.

Further important features and advantages of the invention result from the subclaims, from the drawings and from the associated description of the figures using the drawings.

It goes without saying that the features which are mentioned in the preceding text and are still to be explained in the following text can be used not only in the respectively specified combination, but also in other combinations or alone, without departing from the scope of the present invention.

BRIEF DESCRIPTION OF THE DRAWINGS

Preferred exemplary embodiments of the invention are shown in the drawings and will be explained in greater detail in the following description, identical designations relating to identical or similar or functionally identical components.

In the drawings, in each case diagrammatically.

DETAILED DESCRIPTION OF THE DRAWINGS

Figure 1:
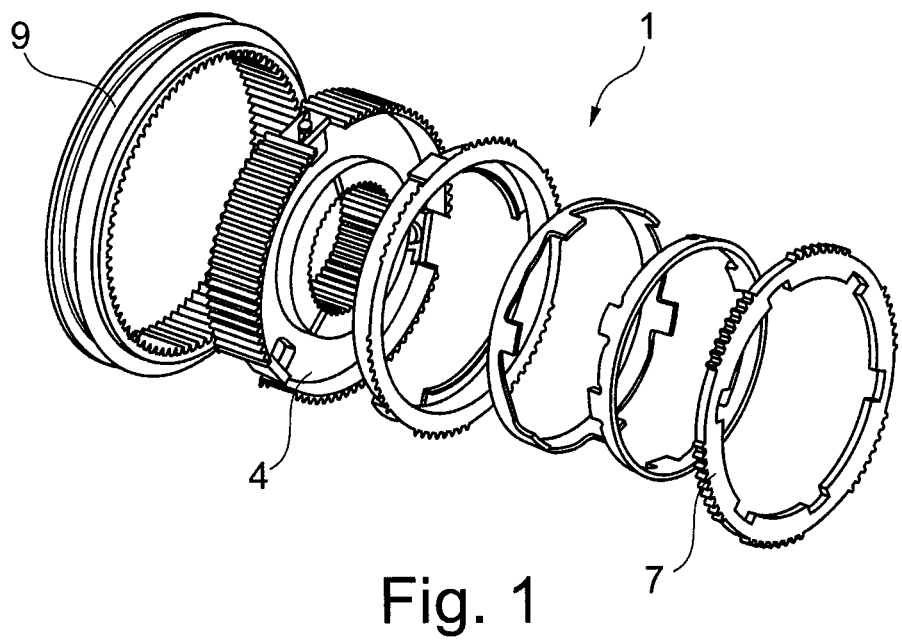
FIG. 1 shows constituent parts of a transmission according to aspects of the invention in an exploded illustration.
Figure 3:
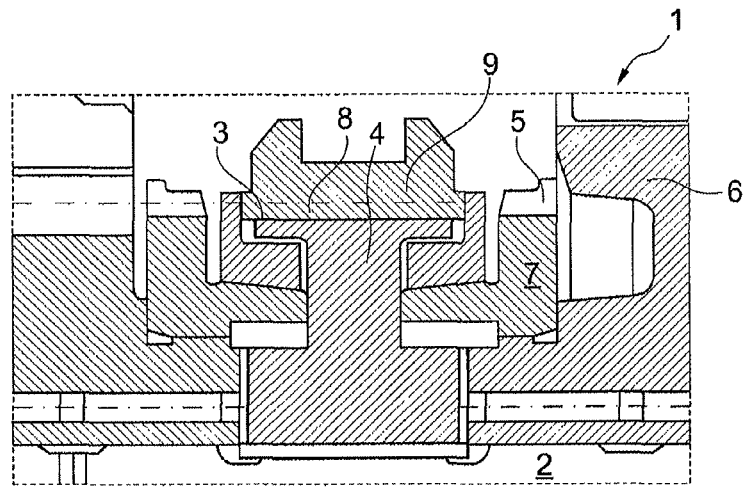
FIG. 3 shows a sectional illustration through a transmission according to aspects of the invention in the region of the guide sleeve.
Figure 4:
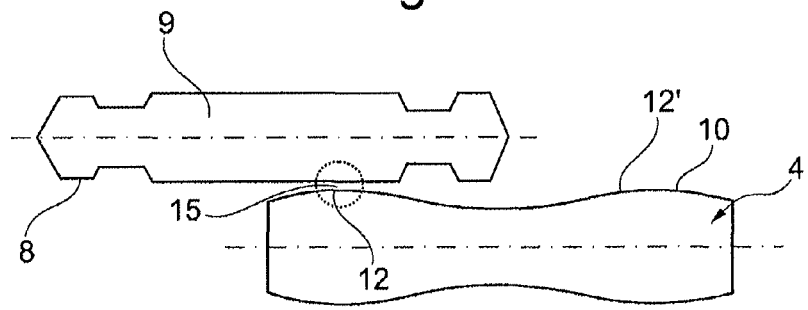
FIG. 4 shows one possible embodiment according to aspects of the invention of a first external toothing system of the guide sleeve.

According to FIGS. 1 and 3, a transmission 1 according to aspects of the invention has at least one shaft 2, on which a guide sleeve 4 which has a first external toothing system 3 is arranged fixedly so as to rotate with it. A clutch element 7 which has a second external toothing system 5 is likewise arranged on the shaft 2. The second external toothing system 5 can also be arranged directly on the movable wheel 6. Moreover, the transmission 1 according to aspects of the invention has a slider sleeve 9 which can be displaced in the axial direction of the shaft 2 and has an internal toothing system 8, it being possible to adjust the slider sleeve 9 between a disengaged position, in which the internal toothing system 8 and the second external toothing system 5 are not operatively connected, and an engaged position, in which the internal toothing system 8 meshes with the second external toothing system 5. According to FIG. 3, the disengaged position is illustrated here. According to aspects of the invention, the internal toothing system 8 and/or the first external toothing system 3 of the guide sleeve 4 are/is configured in such a way that there is merely punctiform contact 15 between them in the engaged position (cf., in particular, FIGS. 4 and 5).

Figure 2:
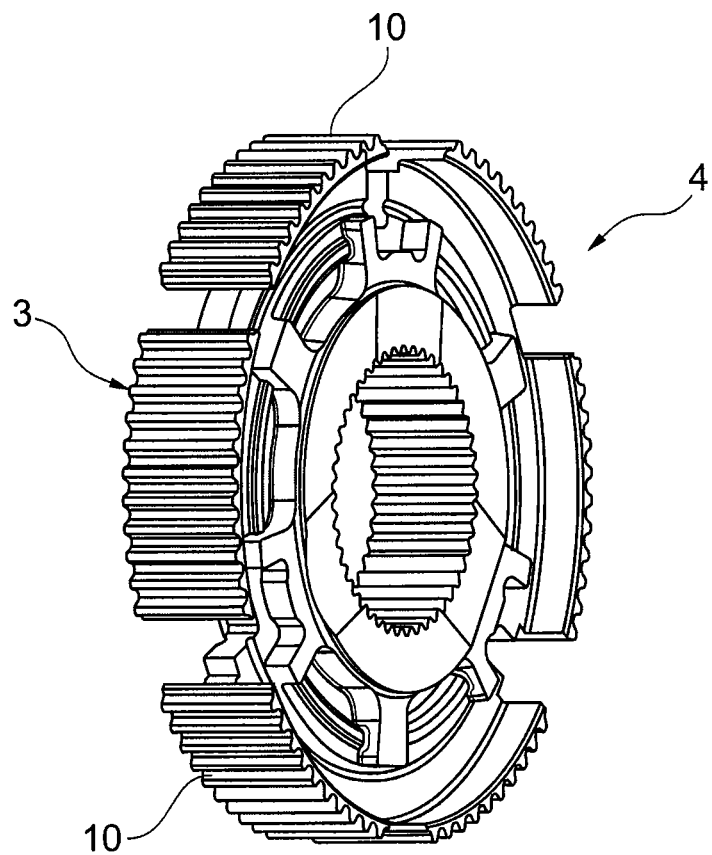
FIG. 2 shows a plan view of a guide sleeve.
Figure 5:
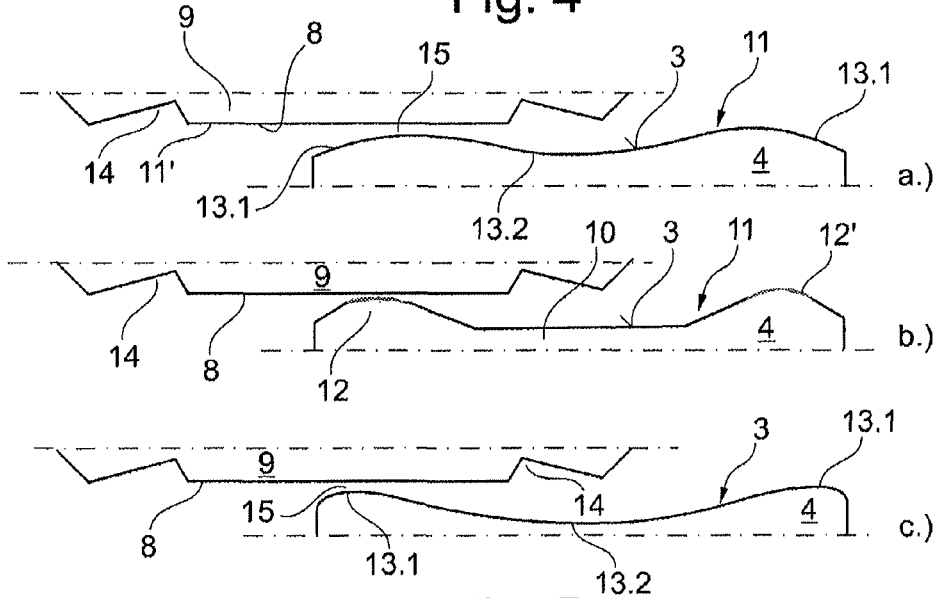
FIGS. 5a-c show first toothing systems of different configuration of the guide sleeve in the contact region with an internal toothing system of a slider sleeve.

The guide sleeve 4 which is configured according to aspects of the invention is shown in plan view in FIG. 2, the first external toothing system 3 of the guide sleeve 4 having a plurality of teeth 10 with in each case one thrust flank 11 and one traction flank which lies opposite it and is not denoted in greater detail. If one views FIGS. 4 and 5 here, it can be seen that at least the thrust flank 11 has two convex bulges 12 and 12' which bring about the merely punctiform contact 15 together with the internal toothing system 8 of the slider sleeve 9, which can be seen clearly, in particular, in FIGS. 4 and 5. Moreover, the flanks of the teeth 10, in particular their thrust flanks 11, are preferably reduced in each case on the end side 13.1 and in the center 13.2 as viewed in the axial direction (cf. FIG. 5a) and, as a result, have an undulating profile in the axial direction. In the reduced and therefore free regions 13.1 and 13.2, a movement space is then produced for the slider sleeve 9 which tumbles in some circumstances, as a result of which squeezing between the slider sleeve 9 and the guide sleeve 4 can be reduced. Here, the undulating profile can substantially correspond to a sine wave, as is shown, for example, according to FIG. 5a. As an alternative, it is also conceivable that the undulating profile has, in the region of the convex bulges 12, 12' and/or as viewed in the axial direction, kinks between them and, as a result, has the profile shown according to FIG. 5b. It goes without saying here that the bulges 12, 12' according to FIG. 5b are likewise shown in such a way that merely punctiform contact 15 is produced between them, that is to say between the guide sleeve 4 and the internal toothing system 8 of the slider sleeve 9. The illustration according to FIG. 5c, in which the central region 13.2 is of concave configuration, is a variant which is likewise to be considered equivalent.

The internal toothing system 8 of the slider sleeve 9 likewise has a plurality of teeth which are equipped with in each case one planar thrust flank 11' and one likewise planar traction flank, Moreover, the traction flank and/or the thrust flank 11' of the internal toothing system 8 of the slider sleeve 9 can have cutouts 14, in particular wedge-shaped cutouts, which can be kept small as standard according to aspects of the invention, since the guide sleeve 4 which is configured according to aspects of the invention considerably reduces the axial forces which act on the slider sleeve 9. Depending on the construction, the frictional force at a given torque can pull the slider sleeve 9 to the movable wheel 6 or else push it away from the latter. If, for example, the slider sleeve 9 is pushed away from the movable wheel 6 to a pronounced extent, what is known as a gear jump can occur, in particular an undesirable disengagement of an engaged gear.

Punctiform contact 15 between the guide sleeve 4 and the internal toothing system 8 of the slider sleeve 9 can be ensured by way of the guide sleeve 4 which is configured according to aspects of the invention and has a double width camber, caused by the at least two convex bulges 12 and 12', as a result of which firstly the magnitude of the axial force which results on the slider sleeve 9 drops to a pronounced extent and secondly a degree of tilting freedom between the guide sleeve 4 and the slider sleeve 9 can be increased considerably. Here, the production of the guide sleeves 4 according to aspects of the invention can be realized simply in terms of manufacturing technology and at the same time inexpensively by corresponding setting of a grinding or milling tool. At the same time, a reduction in acoustic peculiarities, in particular in the low load and low speed ranges, can be achieved by way of the guide sleeve 4 according to aspects of the invention. Here, the convex bulges 12, 12' can be arranged only on the traction flank or on the thrust flank 11 of the guide sleeve 4, or else on both flanks, it being possible for the double width camber to be of different or equal configuration in the case of a provision on both flanks.

What is claimed:

1. A transmission comprising:
   at least one shaft on which a guide sleeve which has a first external toothing system is arranged fixedly so as to rotate with it and at least one slider sleeve which has an internal toothing system is arranged,
   said slider sleeve being adjustable between a disengaged position, in which the internal toothing system and a second external toothing system on a clutch element are not operatively connected, and an engaged position, in which the internal toothing system meshes with the second external toothing system,
   wherein the internal toothing system and/or the first external toothing system are/is configured in such a way that there is merely punctiform contact between them in the engaged position,
   wherein the first external toothing system of the guide sleeve has a plurality of teeth with, in each case, one thrust flank and one traction flank, at least the thrust flanks having two convex bulges.

2. The transmission as claimed in claim 1, wherein, as viewed in an axial direction, the flanks of the teeth are of reduced configuration in each case on an end side thereof and in a center thereof and, as a result, have an undulating profile in the axial direction.

3. The transmission as claimed in claim 2, wherein the undulating profile corresponds substantially to a sine wave.

4. The transmission as claimed in claim 2, wherein the undulating profile has kinks in a region of the convex bulges.

5. The transmission as claimed in claim 1, wherein the internal toothing system of the slider sleeve has a plurality of teeth with, in each case, one planar thrust flank and one planar traction flank.

6. The transmission as claimed in claim 5, wherein the traction flank and/or the thrust flank of the internal toothing system of the slider sleeve have/has cutouts.

7. The transmission as claimed in claim 6, wherein the cutouts are wedge-shaped cutouts.

\* \* \* \* \*